US008879224B2

(12) United States Patent
Moore

(10) Patent No.: US 8,879,224 B2
(45) Date of Patent: Nov. 4, 2014

(54) PORTABLE AND MODULAR ELECTRICAL PEGBOARD SYSTEM

(76) Inventor: Gordon Moore, Aiea, HI (US)

( * ) Notice: Subject to any disclaimer, the term of this patent is extended or adjusted under 35 U.S.C. 154(b) by 379 days.

(21) Appl. No.: 13/283,454

(22) Filed: Oct. 27, 2011

(65) Prior Publication Data

US 2013/0107413 A1 May 2, 2013

(51) Int. Cl.
*H02H 7/00* (2006.01)
*H01R 31/02* (2006.01)

(52) U.S. Cl.
CPC .................................... *H01R 31/02* (2013.01)
USPC ........................................................ 361/62

(58) Field of Classification Search
USPC ........................................................ 361/62
See application file for complete search history.

(56) References Cited

U.S. PATENT DOCUMENTS 3,327,173 A 6/1967 Thompson
3,450,950 A 6/1969 Tarrats
5,582,522 A * 12/1996 Johnson ........................ 439/214
5,658,158 A * 8/1997 Milan ........................... 439/214
6,454,584 B1 * 9/2002 Milan ........................... 439/214
7,411,134 B1 8/2008 Steinfeld

* cited by examiner

*Primary Examiner* — Stephen W Jackson
(74) *Attorney, Agent, or Firm* — Daniel Boudwin; Global Intellectual Property Agency LLC

(57) ABSTRACT

A modular pegboard electrical board comprising an expandable grid of electrical leads to allow connection of various electronic implements, including light fixtures, fluorescent lamp ballasts and heating lamps. A rectangular pegboard having internal circuitry provides columns of electrical leads, whereby every four consecutive columns form a hot-ground-neutral-ground combination of vertical leads in parallel. The combination allows for connection of a two or three-wire interface to attach anywhere on the board surface, including electrical socket adapters and specific light fixture wiring. The pegboard-style board allows a latch mechanism from a light fixture or electrical device to affect an electrical connection at a specific lead. Consecutive boards are attachable using cam locks, while electrical connections between each board connects the boards in series and thus allow power transfer through a plurality of attached boards in an expanded system using a single A/C power receptacle to power the entire system.

8 Claims, 5 Drawing Sheets

PORTABLE AND MODULAR ELECTRICAL PEGBOARD SYSTEM

BACKGROUND OF THE INVENTION

1. Field of the Invention

The present invention relates to modular electrical circuit boards and breadboards for the purposes of mounting light fixtures and other electrical components thereto in an expandable and reconfigurable architecture. More specifically, the present invention pertains to an electrically connected circuit housed within a pegboard style board, whereby electronic accessories such as light fixtures, A/C power adapter devices and other electrical devices may be connected in a desired fashion using a latch mechanism or physically inserting wires into the apertures in the board. A plurality of boards may be connected in series to provide an expanded system of electrical connections, which may be powered by a single source.

The present invention comprises an electrical connectivity board that utilizes vertical columns of alternating hot-ground-neutral-ground connections to allow an electrical device having a hot/neutral or hot/neutral/ground wiring combination to be connected in any position along the board. The vertical columns of the board comprise an electrically connected series of leads, while leads for each column branch from connectors that rung the length of the boards and mate with adjacent boards. A plurality of boards may be joined together, wherein the connection may be achieved through physical, end-to-end connection using cam locks and a male/female electrical connector, or an extension cord member may be utilized to electrically connect two boards in different physical locations using a cord having the three electrical leads therein. A singular grid or a plurality of grids allows a user to configure an array of electrical connections for a particular setup or a specific task. This setup may include a large array of light fixtures whose position may be altered periodically, such as heating lamps for curing coatings on articles.

2. Description of the Prior Art

Typical light fixtures require connection to an A/C power source, which is achieved by connection of a pronged electrical plug into an electrical wall socket, wherein the prongs deliver current to associated hot/neutral wires within the wire of the plug, or in the case of a three-pronged wire, hot/neutral/ground. Typical installations of electrical sockets include a pair of outlets, which are provided together and spaced a given distance around a room. While not ideal, extension cords or power strips may be utilized to expand the connectivity of a singular outlet. Light fixture installations, alternatively, hardwire the electrical connectors of the fixture into existing, powered wiring by splicing the hot/neutral/ground wires together to affect a permanent electrical connection. These two types of installations are standard practice for providing power to light fixtures and similar electrical devices. While fulfilling their respective requirements and practical in their own right, the situation arises wherein a light fixture is desired to be temporarily hardwired into an electrical grid, easily removed therefrom and reconfigured to suit a particular need or requirement of a given task. These situations include those wherein a plurality of heating lamps or UV lamps may be necessary for a given project, but it is not desired to plug each individually into a wall socket or permanently hardwire the assembly.

A need therefore arises for a device that allows modular connectivity of hardwired electrical devices, whereby the devices may be temporarily attached to the device and removed therefrom when desired. The device may be mounted in any configuration to suit a particular need, thereby providing a modular device that allows a plurality of configurations. Such a device is desired to be expandable and easily mount/dismount electrical fixtures and devices therefrom.

The present invention provides a device that addresses these needs by providing modular electrical connectivity device that incorporates hot/ground/neutral wiring connections in a grid array to allow attachment of fixtures and similar electrical devices thereto in a modular and user-defined fashion. The grid array is offered in a pegboard style board, wherein vertically aligned columns of apertures provide physical locations for securement and connectivity of electrical leads from a fixture or electrical device. The columns are provided in a specific order to allow connection to the leads in any position, wherein that position will supply a hot/ground/neutral combination across three columns. The apertures of the pegboard provide structural support for large fixtures, which is provided by a latch or hook device with internal electrical wiring or electrical connectivity to affect transference of current, in the form of a hot/ground or hot/ground/neutral combination. Several boards may be connected to provide a large grid of electrical connections, which are safely housed within the interior of a pegboard style structure, eliminating loose wiring, shorts or risk of electrical shock. The fixtures connectors achieve an electrical connection within the apertures without splicing wires or exposing the user to a bare wire during installation or removal.

Related devices in the art include electrical connectivity boards and breadboards for the purposes of creating a temporary circuit design. While useful for circuit building, these devices are generally for smaller scale electrical components, including placement of resistors, capacitors and similar devices in an arrangement to affect a given output based on an input. These devices lack the ability to attach larger fixture thereto and provide an expanded electrical grid or physical support for fixtures attached thereto. Other devices are limited to a particular aspect of electrical grid boards that limit their ability to function as the present invention is intended.

U.S. Pat. No. 7,411,134 to Steinfeld is one such patent that discloses an electrical mounting board and method for fabrication, wherein hybrid ground lines are interconnected through a substrate core to form a grid of electrical connections. The ground lines are substantially parallel in configuration and formed on the same level. The Steinfeld device is adapted for more efficiently routing signal lines and electrical components on a circuit board. It is designed as a grid within a substrate to provide improved layout of electrical components on a printed circuit board (PCB). While similar to the present invention in the fact that a grid of electrical connections are provided in a grid format, its uses and intent differ. The present invention is adapted to be used on a larger scale, wherein electrical boards are provided, wherein electrical connections on each board provide a modular interface to mount various macro scale electrical devices, such as light fixtures and the like, and to provide a grid that can connect to a plurality of grids in a modular and configurable fashion to suit a given need or preference by the user.

U.S. Pat. No. 3,450,950 to Tarrats is another device that discloses a means of affecting an electrical connection between printed circuit boards utilizing removable connect clips having lateral contact elements that engage portions of a printed circuit board. The Tarrats device discloses a contact or interconnecting means between an array or plurality of printed circuit boards, and providing electrical connection therebetween. The present invention provides an expandable grid that utilizes electrical connectors or an extension cord member to affect an electrical connection and flow of power between a plurality of boards, providing a configurable set of boards that may derive power and have electrical connection over several boards. The means for facilitating this connection differ from the Tarrats disclose. While adapted for its specific task of connecting printed circuit boards and providing electrical connection between a plurality of boards, the structure and means for the connection differ from the present invention.

Finally, U.S. Pat. No. 3,327,173 to Thompson describes a device for building an electrical circuit and connectivity for electrical equipment, particularly for an electrical apparatus that provides a breadboard or temporary electrical design architecture. The device comprises an electrical board that permits the assembly of electrical components thereon, whereby the board provides electrical contacts necessary to build the connect the desired components. While the Thompson device provides a device for building and connecting electrical components, its structure and design diverge from the elements disclosed by the present invention. The present invention provides a greater degree of modularity by providing a grid of electrical connections, aligned in a grid format and in such a fashion to allow connection of electrical components and fixtures thereto, while providing a modular interface and expandable design.

The present invention provides a modular and expandable electrical connectivity grid that provides power and support for electrical fixtures and similar electrical devices requiring hot/neutral or hot/neutral/ground connections to function. Its structure and design substantially diverges in elements from the prior art and consequently it is clear that there is a need in the art for an improvement to existing electrical connectivity devices. In this regard the instant invention substantially fulfills these needs.

SUMMARY OF THE INVENTION

In view of the foregoing disadvantages inherent in the known types of electrical connectivity boards now present in the prior art, the present invention provides a new electrical grid and fixture support wherein the same can be utilized for providing convenience for the user when providing modular connectivity to support a plurality of light fixtures or similar electrical devices in a desired setup to suit a given project or preference.

It is therefore an object of the present invention to provide a new and improved electrical connectivity board device that has all of the advantages of the prior art and none of the disadvantages.

Another object of the present invention to provide an electrical connectivity board having a pegboard structure and internal wiring to provide a grid of electrical leads, the structure forming apertures for connection of electrical fixtures thereinto for powering the fixture.

Another object of the present invention is to provide an electrical connectivity board wherein the provided grip of apertures provides structural support and electrical connectivity for hardwired connections or electrically conductive attachment devices of electrical fixtures.

Another object of the present invention is to provide an electrical connectivity board wherein the columns of the pegboard structure forms columns of hot/ground/neutral/ground electrical leads from column to column. The repetition of this pattern allows any three columns to provide three different electrical leads, independent of location on the board.

Another object of the present invention is to provide an electrical connectivity board that can be attached, physically and electrically, to other boards, whereby electrical connection is achieved and power is transmitted from one board to another.

Another object of the present invention is to provide an electrical connectivity board with a circuit breaker or fuse to prevent power surges from damaging attached hardware or injuring a user.

Yet another object of the present invention is to provide a three-ribbon extension cord member for attachment of two boards a given distance apart, whereby the hot/neutral/ground leads are connected from one board to another.

A further object of the present invention is to disclose an electrical socket attachment for use on the disclosed pegboard-style electrical connectivity board, whereby electricity is available from the board via the socket when mated to a two or three-pronged plug.

A final object of the present invention is to provide an electrical connectivity device that provides modular and reconfigurable power to suit a given task or a user's needs, whereby the electrical boards may be positioned in any orientation or position with respect to one another and draw power from a single source.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
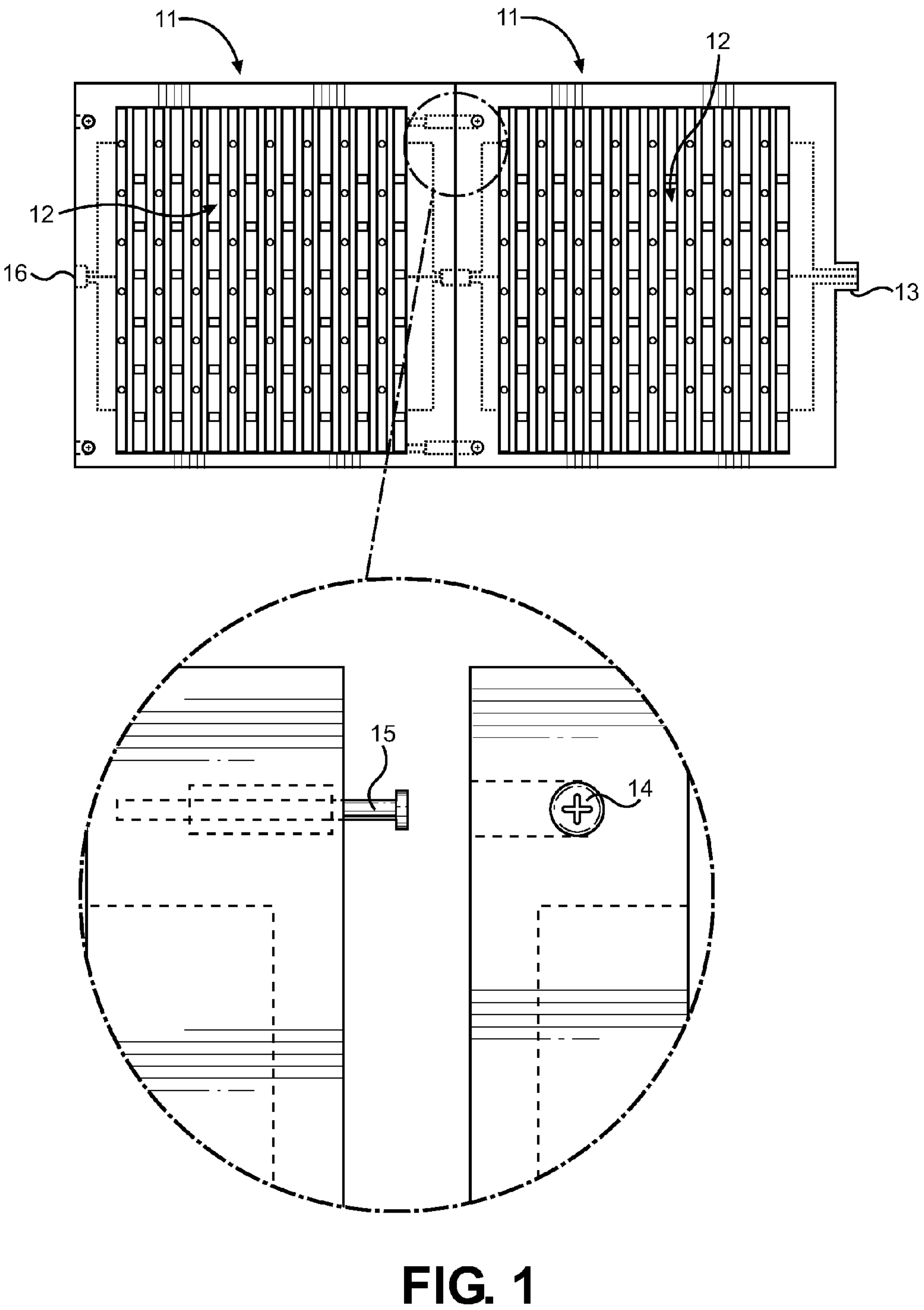
FIG. 1 shows a view of the present invention, wherein two boards are connected using cam locks and the electrical circuitry and columns of electrical leads are presented.

Reference is made herein to the attached drawings. Like reference numerals are used throughout the drawings to depict like or similar elements of the electrical connectivity board. For the purposes of presenting a brief and clear description of the present invention, the preferred embodiment will be discussed as used for providing electrical connections to supported fixtures in a modular and expandable design. The figures are intended for representative purposes only and should not be considered to be limiting in any respect.

Referring now to FIG. 1, there is shown a front view of the electrical connectivity board of the present invention, wherein two boards 11 are attached to one another and form an electrical connection therebetween. Each board 12 comprises a generally flat structure with an internal volume to house imbedded lead wires that are routed throughout and aligned in a specific pattern. On opposing ends of each board is a first and second electrical connector, wherein the first is a female connector 16 and the second is a male connector 13, allowing two boards to be physically attached side-by-side and to affect an electrical connection therebetween. Also along the edges of each board are mechanical connectors that physically bind the two boards together to prevent dislodgement of the electrical connections. In a particular embodiment, and shown in FIG. 1, a plurality of cam locks 14 are utilized along a first side of a board to secure an associated cam screw 15 along a second side of an adjacent board. The cam lock 14 accepts the head of the screw 15, and the cam lock is then rotated to secure the two together and join the two boards side-by-side.

Along the interior volume of each board is an array of electrical wiring, which routes electrical leads from the female connector 16, or from an associated NC power plug, to a grid of aligned columns. Three electrical leads are provided on the board in the form of hot, neutral and ground wires that can be utilized to provide power through an attached device. Columns of hot, neutral and ground leads are provided along the surface of the board, wherein a plurality of apertures along each column allows a fixture connector to make contact with an electrical lead and effectuate an electrical connection therewith. The apertures form a grid that appears similar to a pegboard. The present invention therefore provides a pegboard style grid that functions as a physical support, which provides structural support for articles and fixtures attached to the board. Mechanical connections, in the form of a latch or hook, are inserted into an aperture. The mechanical connection further provides electrical conductivity therethrough, allowing the aperture to function as both a physical, as well as an electrical connection. A set of apertures are connected at one time, forming at least one hot/neutral connection to flow current through the attached fixture for power delivery, whereby the fixture provides the load through which current flows. A third connection, in the form of a ground connection, may further be incorporated into the attached set to electrically ground the fixture and prevent electrical discharge while the fixture is in use.

Figure 2:
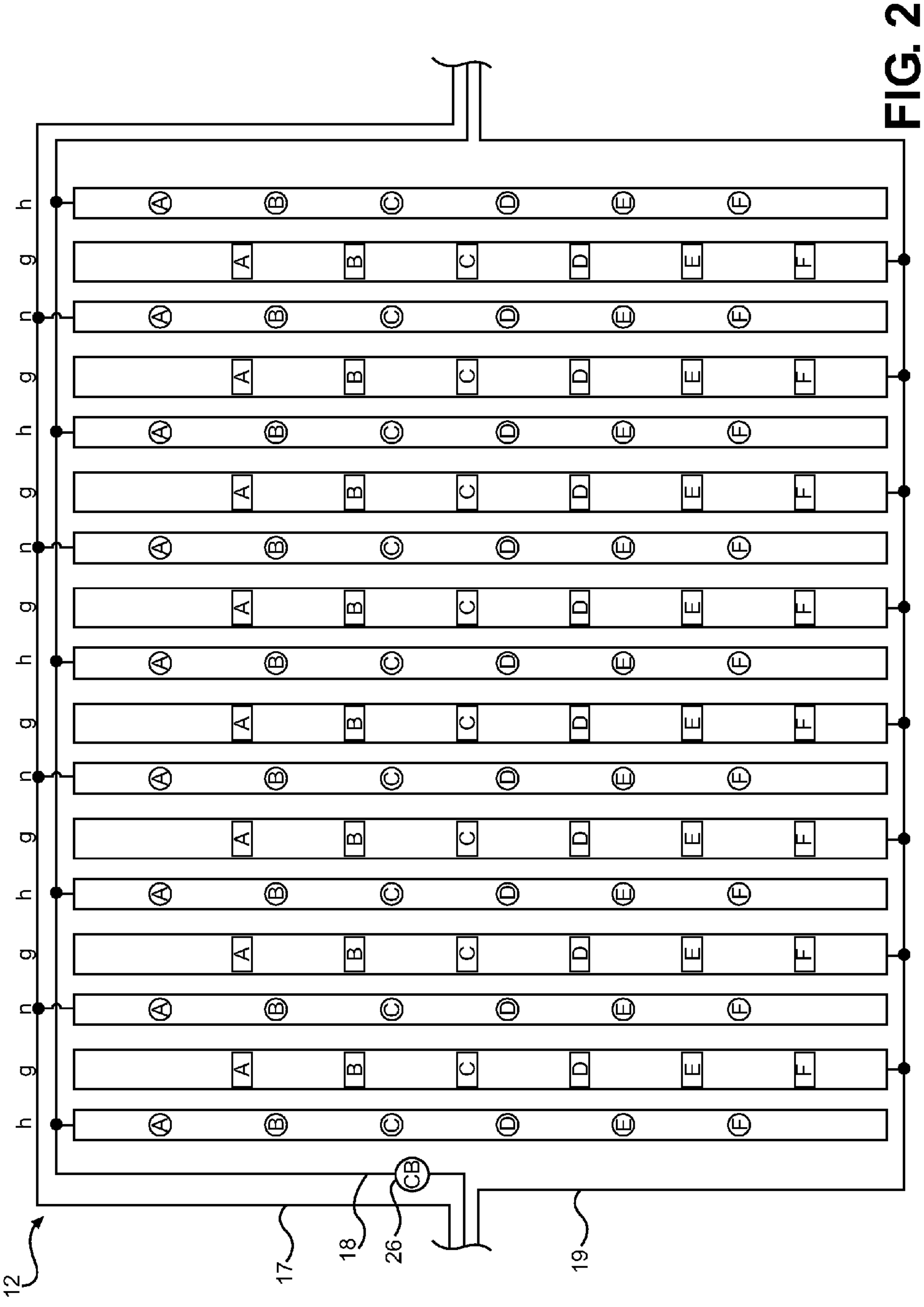
FIG. 2 shows a wire diagram of the present invention, wherein the columns of electrical leads, and their connectivity, is shown.

Referring now to FIG. 2, there is shown a view of the present invention electrical connections, whereby a plurality of leads is disposed in columns and the wiring of each column is illustrated. The plurality of columns is positioned in such a manner as to allow connection of a fixture or electrical device have a hot/neutral or hot/ground/neutral connector be positionable anywhere along the board, wherein the fixture provides a load between a hot/neutral connection. Hot 18 and neutral 17 wires route from a first side of the device and along the top of the board. Branches from the hot and neutral wires create vertical columns of hot and neutral electrical connections in which an external device may be attached therealong through the apertures provided along each column length. The external device contacts one hot and one neutral lead, allowing current to flow into the device to operate the fixture as desired. A ground 19 wire routes along the base of the board and provides branches of a grounded wire for attachment of a fixture requiring grounding. A circuit breaker switch of fuse is provided on each board, which prevents the hot lead wire from surging current above a specified level, which can damage attached devices and create an electrical shock risk. The switch or fuse is placed in line with the hot lead wire 18 in proximity to the female connector.

Every other column is provided a ground, while the order of hot and neutral wire is alternated between ground leads to allow connection of a hot/ground/neutral or neutral/ground/hot connector in any position on the board. In this way, the board provides a modular array of connector locations, wherein a three wire or two wire fixture may be attached. The wires 17, 18, 19 terminate on either end of the board at a female and male connector, whereby the connector may attach to an adjacent board and provide flow of power from a first board to a second without the need for an additional power source. A connector from the power source, such as a wall outlet, provides connection to the hot, neutral and ground leads in the board, whereby current may flow through. Each column is a branch in the circuit tree, whereby a fixture may connect a neutral and hot branch to allow current to flow through, whereby the fixture provides a load through which the electrical current travels from the hot to the neutral branch.

Figure 3:
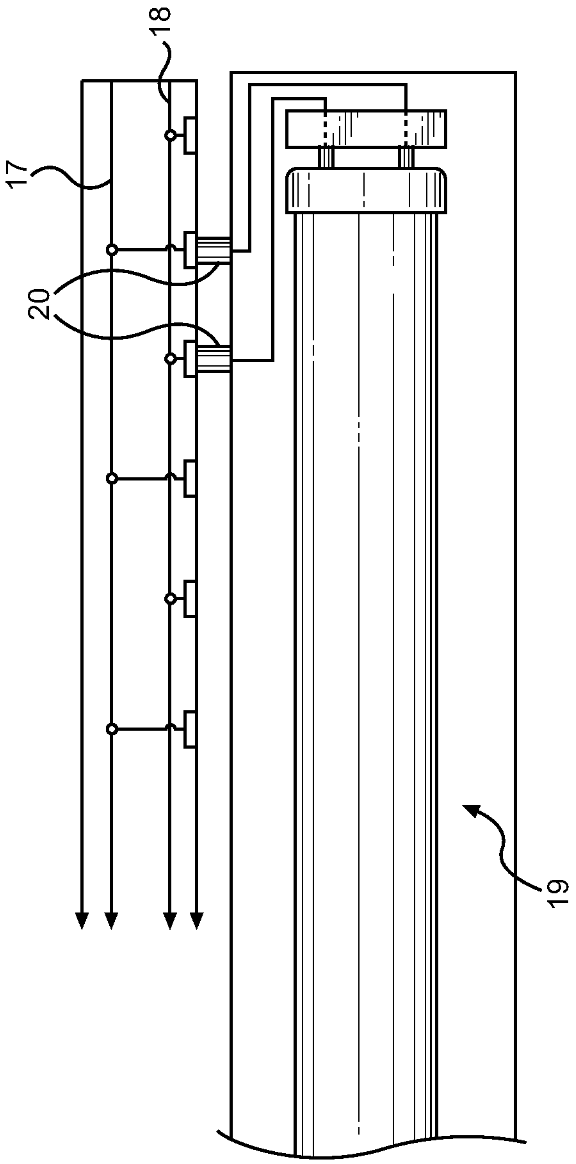
FIG. 3 is an overhead view of a typical light fixture installation, whereby the fixture is connected to the electrical leads of the present invention.

Referring now to FIG. 3, there is shown an overhead view of an embodiment of a light or heat lamp fixture 19 attachable to the disclosed electrical connectivity board. The light fixture 19 comprises a light bulb or similar resistive structure, a support stand for support the bulb and a first and second connective latch 20 for attachment into the pegboard apertures of the present invention. The first and second latch 20 affix into apertures on the board for structural support, while also affecting an electrical connection with a first and second branch of electrical leads. These two leads comprise a hot and neutral connection, allowing current to flow from the hot lead, through the fixture and return through the neutral lead, powering the fixture in the process. Any fixture that can affect a mechanical and electrical connection with the board may be incorporated. It is not desired to limit the type of connector or the type of fixture that may be utilized with the present invention, but rather it is desired to show a particular embodiment of such a fixture that is known to function in connection with the disclosed invention.

Figure 4:
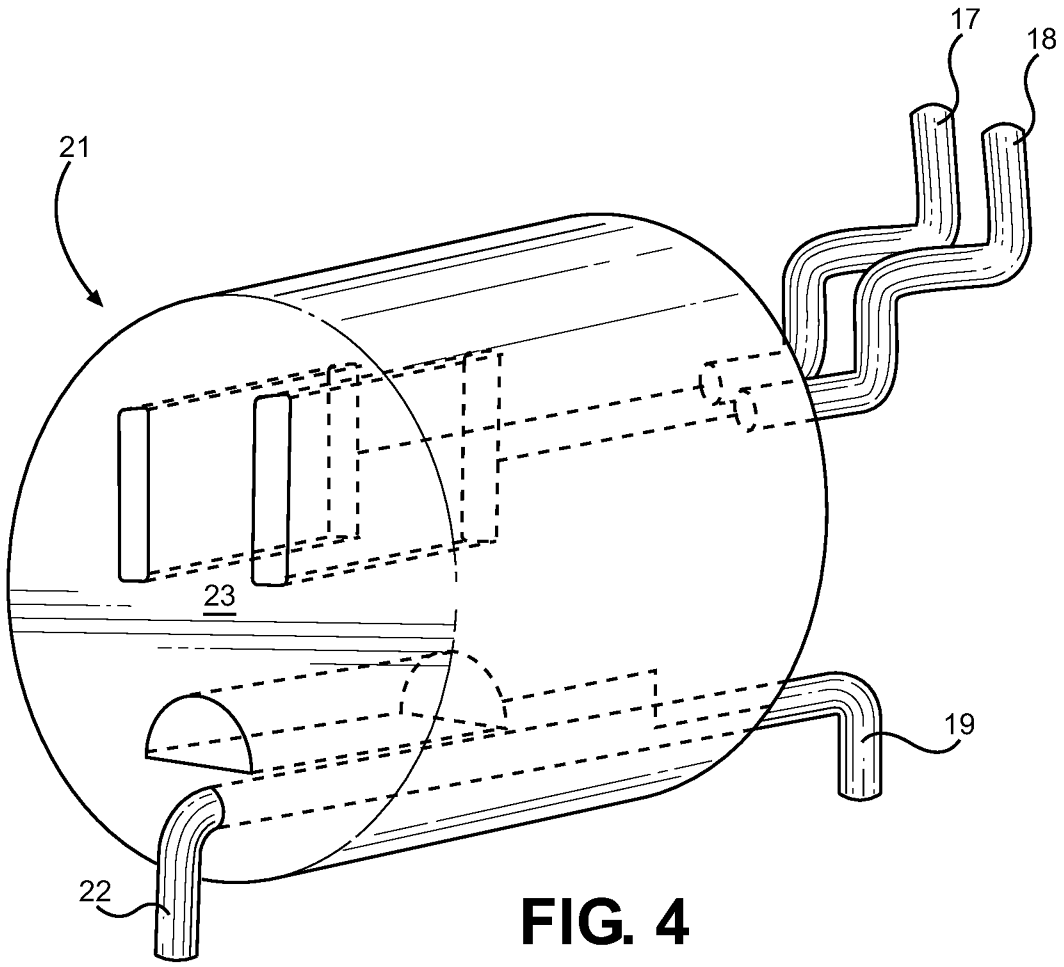
FIG. 4 is a perspective view of the NC power socket attachment of the present invention, connectable to the pegboard leads for providing power to a device having a plug interface.

The situation may arise wherein an external electrical device may not include the appropriate connectors or accessible wiring to permit connection to the disclosed board. To permit the connection of a standard electrical device having a two or three-pronged electrical plug connector, a portable NC connector device is further disclosed for connection to the pegboard leads. Referring now to FIG. 4, there is shown a perspective view of an A/C connector device 21 operable with the disclosed electrical connectivity board. The first end 23 of the connector employs a two or three-pronged interface for accepting a corresponding electrical plug. The second end of the device employs two or three connectors, a hot 17 and neutral 18 connector and an optional ground 19 connector. These connectors are adapted to be placed within the apertures of the board to provide electrical connection. The ground connector 19 may further employ a locking mechanism 22, wherein the connector is rotated 180 degrees to secure the device 21 onto the board and prevent dislodgement.

Figure 5:
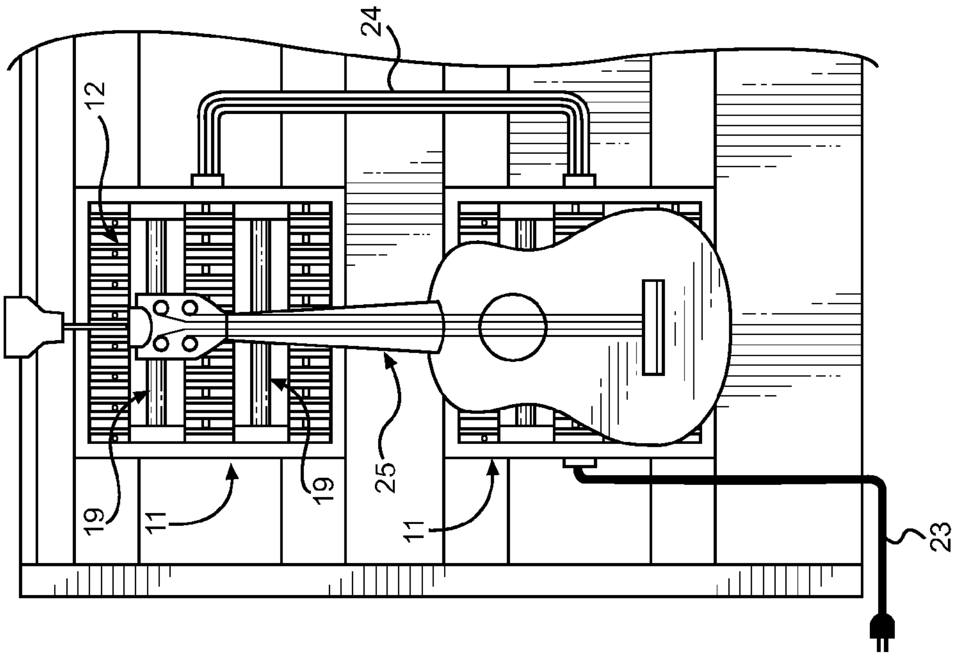
FIG. 5 shows a front view of an application of the present invention, wherein a plurality of boards are situated in a fixture and support curing lamp fixtures thereon.

Referring now to FIG. 5, there is shown a front view of an application of the present invention, wherein two boards 11 are being utilized in connection with one another to support a plurality of heating lamps to cure a resin applied to a work piece 25. In this view, a first and second board 11 is connected by a ribbon cable 24 that routes the hot, ground and neutral wires from the first to the second board. A single electrical power source is utilized to power the first board, while the ribbon cable 24 routes power from the first board and into the second board. The power cord 23 is utilized to draw electrical power into the first board, wherein current flows from the first to the second board to power all branches of the two respective circuits. The power cord is a removable accessory that plugs into the first electrical connector on a respective board to provide power to the system. Alternatively, a ribbon cable from another board may be used to distribute power from a third board. In this way, the system is modular in its setup and flexible to accommodate different tasks and requirements. Along each board is positioned a plurality of heating lamp fixtures 19, which are supported by connectors that attached to apertures along the boards. The same connectors supply electrical power from hot to neutral branches of the board and through the light fixture heat lamps. As shown, the boards 11 are positionable as desired for the given application, wherein their proximity is not limited to a side-by-side configuration. An elongated ribbon cable 24 can connect boards at varying distances, while only a single power source is necessary to supply power to both boards during operation.

Figure 6:
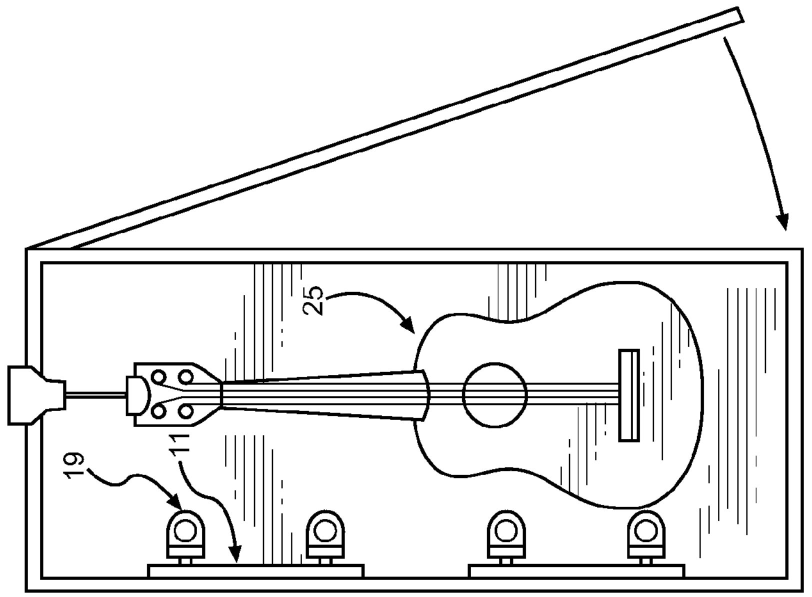
FIG. 6 shows a side view of the same application of the present invention, wherein the curing lamp fixtures are shown from the side and the work piece is rotated.

Referring now to FIG. 6, there is shown a side view of the same application, wherein two electrical connectivity boards 11 are positioned within an enclosure for powering a plurality of heating lamp fixtures 19. The lamp fixtures 19 are provided electrical power by the boards 11, while a work piece 25 is suspended from within the enclosure during operation.

In use, the present invention provides a modular and expandable grid of electrical connectors for which to power associated electrical fixtures. The electrical connectors are disposed within a pegboard style board, wherein a plurality of columns is provided for connection of a fixture hot, neutral and ground wires. The columns are disposed in such an order to permit connection of any three connector wires in any three consecutive columns of the board. The exact connector and style of to affect both a mechanical and electrical connection is any hook style, conductive material that allows fixtures to be suspended from the board and current to flow through the connection and into the fixture. The spacing and size of the apertures along the board are adapted to differ from a standard workshop pegboard that is utilized to hold tools and other articles. The apertures are different sizes and do not accept standard pegboard style hooks in order to prevent inadvertent electric shock if a user mistakes the board for a non-electrical device and attempts to place a standard metal hook into an aperture. This safety feature eliminates the chances that an individual may be injured by mistaking the pegboard electrical device for a standard workshop pegboard support device.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electrical connectivity board, comprising:

a board structure with an internal volume, a first and a second end;

said board having columns of apertures;

a hot, neutral and ground wire routing from said board first end to said second end;

hot, ground and neutral wire branches from said hot, neutral and ground wire routing forming individual columns;

said branches aligned in a hot/ground/neutral/hot order from said first to said second end;

said apertures providing electrical connection to column branches and structural support for attached electrical fixtures.

2. The device of claim 1, wherein said wire routing initiates from a female electrical connector on said board first side and terminates at a male electrical connector on said board second side, wherein said female and male electrical connectors may join between two boards.

3. The device of claim 2, wherein an A/C power cord is adapted to provide power to said hot, neutral and ground wire routing via connection with said female electrical connector.

4. The device of claim 1, wherein a ribbon cable provides electrical connection of said hot, neutral and ground wire routing between connectors of two boards.

5. The device of claim 1, further comprising an attachment means for joining two adjacent boards.

6. The device of claim 5, wherein said attachment means comprises a cam lock and screw connector.

7. The device of claim 1, further comprising an A/C connector device having a first and second end, said first end having an electrical plug interface, said second end having connectors to contact hot and neutral leads or hot, neutral and ground leads of said board through said apertures.

8. The device of claim 1, further comprising a circuit breaker switch or fuse along said hot wire routing to prevent surges of electricity above a specified limit.

* * * * *